United States Patent
Boone et al.

(10) Patent No.: US 9,545,757 B1
(45) Date of Patent: Jan. 17, 2017

(54) COMPOSITE LAY UP AND METHOD OF FORMING

(71) Applicant: Textron Innovations, Inc., Providence, RI (US)

(72) Inventors: Richard Boone, Wichita, KS (US); Benjamin De Putter, Maize, KS (US)

(73) Assignee: Textron Innovations, Inc., Providence, RI (US)

( * ) Notice: Subject to any disclaimer, the term of this patent is extended or adjusted under 35 U.S.C. 154(b) by 155 days.

(21) Appl. No.: 14/152,532

(22) Filed: Jan. 10, 2014

Related U.S. Application Data

(63) Continuation-in-part of application No. 13/763,543, filed on Feb. 8, 2013, now abandoned.

(60) Provisional application No. 61/596,604, filed on Feb. 8, 2012.

(51) Int. Cl.
  *B29C 70/30*  (2006.01)
  *B32B 3/28*  (2006.01)
  *B32B 38/00*  (2006.01)
  *B32B 5/12*  (2006.01)

(52) U.S. Cl.
  CPC ............... *B29C 70/30* (2013.01); *B32B 3/28* (2013.01); *B32B 5/12* (2013.01); *B32B 38/0012* (2013.01)

(58) Field of Classification Search
  CPC ......... B29C 70/30; B29C 70/462; B29C 70/46
  See application file for complete search history.

(56) References Cited

U.S. PATENT DOCUMENTS

| | | | |
|---|---|---|---|
| 3,550,422 A * | 12/1970 | Potter | B21D 11/02 72/342.1 |
| 3,768,760 A | 10/1973 | Jensen | |
| 4,257,835 A * | 3/1981 | Bompard | B29C 70/24 156/155 |
| 4,268,561 A | 5/1981 | Thompson et al. | |
| 4,385,949 A | 5/1983 | Fontes | |
| 4,548,065 A * | 10/1985 | Vyhnal | B21D 11/18 72/296 |
| 4,622,254 A | 11/1986 | Nishimura et al. | |
| 4,720,255 A * | 1/1988 | Mittelstadt | B29B 15/08 156/443 |
| 4,770,929 A | 9/1988 | Nobumasa et al. | |
| 4,833,029 A | 5/1989 | DuPont et al. | |
| 4,883,700 A | 11/1989 | Harpell et al. | |

(Continued)

OTHER PUBLICATIONS

U.S. Appl. No. 13/763,543 Office Action dated Dec. 3, 2014, 14 pages.

(Continued)

*Primary Examiner* — Matthew Daniels
(74) *Attorney, Agent, or Firm* — Erise IP, P.A.

(57) ABSTRACT

A fiber reinforced composite structure includes multiple plies of pre-impregnated fiber reinforced material. Consecutive plies are layered such that the fibers of one ply are at 90 degrees relative to the fibers of a proximate ply, and such that the fibers of each ply are oriented at positive or negative 45 degrees with respect to a reference plane of the fiber reinforced composite structure. In a method for fabricating a fiber reinforced composite structure, pre-impregnated fiber reinforced composite plies are layered into a tool layup. Each ply is cut on the bias at either plus 45 degrees or minus 45 degrees. The bias angles of the layered plies alternate one relative to the next. The layered plies are cured after layering.

10 Claims, 5 Drawing Sheets

(56) References Cited

U.S. PATENT DOCUMENTS

| | | | |
|---|---|---|---|
| 5,055,242 A | 10/1991 | Vane | |
| 5,100,713 A | 3/1992 | Homma et al. | |
| 5,123,985 A | 6/1992 | Evans et al. | |
| 5,242,523 A * | 9/1993 | Willden | B29C 70/44 |
| | | | 156/245 |
| 5,338,497 A | 8/1994 | Murray et al. | |
| 5,358,583 A * | 10/1994 | Hatchadoorian | B29C 53/083 |
| | | | 156/166 |
| 5,368,807 A | 11/1994 | Lindsay | |
| 5,445,693 A | 8/1995 | Vane | |
| 5,562,796 A | 10/1996 | Ertl | |
| 5,604,010 A | 2/1997 | Hartz et al. | |
| 5,624,519 A | 4/1997 | Nelson et al. | |
| 5,707,576 A | 1/1998 | Asher | |
| 5,855,709 A | 1/1999 | Bocoviz et al. | |
| 6,114,012 A * | 9/2000 | Amaoka | B29C 70/30 |
| | | | 244/119 |
| 6,128,998 A | 10/2000 | Freitas et al. | |
| 6,458,309 B1 | 10/2002 | Allen et al. | |
| 6,589,472 B1 | 7/2003 | Benson et al. | |
| 6,599,610 B2 | 7/2003 | Homma et al. | |
| 6,632,502 B1 | 10/2003 | Allen et al. | |
| 6,702,911 B2 * | 3/2004 | Toi | B29C 70/443 |
| | | | 156/285 |
| 7,124,982 B2 * | 10/2006 | Brofeldt | B64C 1/12 |
| | | | 244/119 |
| 7,790,637 B2 | 9/2010 | DiFonzo et al. | |
| 7,943,076 B1 | 5/2011 | Hawkins et al. | |
| 8,057,617 B2 | 11/2011 | Fujimoto | |
| 8,182,640 B1 | 5/2012 | Boone et al. | |
| 8,192,574 B1 | 6/2012 | Boone | |
| 8,556,213 B2 | 10/2013 | Markowski et al. | |
| 2002/0006523 A1 | 1/2002 | Obeshaw | |
| 2002/0071920 A1 | 6/2002 | Obeshaw | |
| 2003/0082385 A1 | 5/2003 | Li et al. | |
| 2003/0168555 A1 | 9/2003 | Livi et al. | |
| 2003/0175520 A1 | 9/2003 | Grutta et al. | |
| 2003/0198775 A1 | 10/2003 | Roth et al. | |
| 2004/0115299 A1 | 6/2004 | Potter et al. | |
| 2004/0134593 A1 | 7/2004 | Ishibashi et al. | |
| 2004/0175555 A1 | 9/2004 | Ogisu | |
| 2004/0222537 A1 * | 11/2004 | Sidhu | B29D 11/0073 |
| | | | 264/1.31 |
| 2005/0042410 A1 * | 2/2005 | Sakonjo | B29B 11/16 |
| | | | 428/66.6 |
| 2005/0183808 A1 | 8/2005 | Barguet et al. | |
| 2005/0183818 A1 | 8/2005 | Zenker et al. | |
| 2006/0006599 A1 | 1/2006 | Shahidi et al. | |
| 2006/0049552 A1 | 3/2006 | Fish | |
| 2006/0216480 A1 * | 9/2006 | Weidmann | B29C 70/32 |
| | | | 428/174 |
| 2006/0222837 A1 | 10/2006 | Kismarton | |
| 2006/0249868 A1 * | 11/2006 | Brown | B29C 70/342 |
| | | | 264/163 |
| 2006/0254710 A1 | 11/2006 | Jung et al. | |
| 2007/0102839 A1 | 5/2007 | McGowan | |
| 2007/0161483 A1 * | 7/2007 | Raf | B29C 70/345 |
| | | | 493/296 |
| 2007/0236354 A1 | 10/2007 | Green | |
| 2008/0048359 A1 | 2/2008 | Krogager et al. | |
| 2008/0083494 A1 | 4/2008 | Sander et al. | |
| 2008/0111024 A1 | 5/2008 | Lee et al. | |
| 2008/0265093 A1 | 10/2008 | Lopez et al. | |
| 2008/0283177 A1 * | 11/2008 | Glain | B29C 70/56 |
| | | | 156/160 |
| 2008/0289743 A1 * | 11/2008 | Tsotsis | B29B 11/16 |
| | | | 156/93 |
| 2008/0311326 A1 | 12/2008 | Fujimoto | |
| 2009/0020645 A1 | 1/2009 | Cacciaguerra | |
| 2009/0074905 A1 | 3/2009 | Matsen et al. | |
| 2009/0120562 A1 | 5/2009 | Tsotsis et al. | |
| 2009/0190277 A1 * | 7/2009 | Hiew | G06F 1/1632 |
| | | | 361/56 |
| 2009/0233044 A1 | 9/2009 | Sun et al. | |
| 2009/0261199 A1 | 10/2009 | McCarville et al. | |
| 2009/0263618 A1 * | 10/2009 | McCarville | B29C 70/30 |
| | | | 428/113 |
| 2009/0283638 A1 | 11/2009 | Rodriguez et al. | |
| 2009/0320398 A1 | 12/2009 | Gouvea | |
| 2010/0086727 A1 | 4/2010 | Katayama et al. | |
| 2010/0098910 A1 | 4/2010 | Naritomi et al. | |
| 2010/0136293 A1 | 6/2010 | Kubryk et al. | |
| 2010/0159189 A1 | 6/2010 | Takagi et al. | |
| 2010/0233424 A1 | 9/2010 | Dan-Jumbo et al. | |
| 2010/0285265 A1 | 11/2010 | Shinoda et al. | |
| 2011/0045232 A1 | 2/2011 | Kismarton | |
| 2011/0064908 A1 | 3/2011 | Kweder | |
| 2011/0097554 A1 | 4/2011 | Kehrl et al. | |
| 2012/0308766 A1 | 12/2012 | Kweder | |
| 2013/0034684 A1 | 2/2013 | Meyer et al. | |
| 2013/0234352 A1 * | 9/2013 | De Mattia | B29C 70/342 |
| | | | 264/40.5 |
| 2013/0327472 A1 | 12/2013 | De Mattia | |
| 2013/0330503 A1 | 12/2013 | Kismarton | |
| 2014/0170371 A1 | 6/2014 | Kamiya et al. | |

OTHER PUBLICATIONS

Office Action in related U.S. Appl. No. 12/829,234 dated Jan. 3, 2011, 10 pages.

Response to Office Action in related U.S. Appl. No. 12/829,234 dated Mar. 18, 2011, 10 pages.

Office Action in related U.S. Appl. No. 12/829,234 dated Mar. 31, 2011, 13 pages.

Office Action in related U.S. Appl. No. 12/779,706 dated Aug. 1, 2011, 18 pages.

Notice of Allowance issued in related U.S. Appl. No. 12/779,706 dated Jan. 26, 2012, 9 pages.

Notice of Allowance issued in related U.S. Appl. No. 12/829,234 dated Jan. 19, 2013, 15 pages.

Office Action in related U.S. Appl. No. 13/763,543 dated Aug. 15, 2014, 17 pages.

Weaver et al. (2002) "The Effect of Flexural/Twist Anisotropy on Compression Buckling of Quasi-Isotropic Laminated Cylindrical Shells," Composite Structures. 55:195-20, 10 pages.

* cited by examiner

COMPOSITE LAY UP AND METHOD OF FORMING

CROSS-REFERENCE TO RELATED APPLICATIONS

This application is a continuation-in-part of U.S. patent application Ser. No. 13/763,543, filed Feb. 8, 2013, which claims priority of U.S. Provisional Patent Application No. 61/596,604, filed Feb. 8, 2012, both of which are incorporated herein by reference.

BACKGROUND OF THE INVENTION

1. Field of the Invention

The invention relates generally to the field of composite design and more specifically to the field of structural detail fabrication.

2. Description of the Related Art

Laminates contain fibers having a given direction of the fibers within a resin. Unidirectional laminates are usually suitable for carrying loads in only one direction. They are usually weak in the transverse direction to ply orientation. The properties of unidirectional composites are quite different from isotropic materials. Unidirectional materials are highly anisotropic and have exceptional properties, for example, strength, in the fiber direction and mediocre properties perpendicular to the fiber direction. On the other hand, isotropic laminates may be equally strong in all directions.

There are limited applications where composites are used (or bear a load) purely in a unidirectional configuration. In most applications, there will be some loading away from the direction of the fibers. In this situation, if a unidirectional laminate is used, it is only the resin, which is not itself reinforced, that resists this off-axis load. Hence, composite structures are conventionally made by combining unidirectional fibers in different directions relative to one another to enhance load bearing capacity. Such laminates are known as multi-directional laminates.

Stacking laminates with plies in different orientations is useful when there is a need to optimize multi-directional load-carrying capacity. One common way of creating these multi-directional laminates is to layer the laminates with each laminate layer having a ply bias or fiber orientation angle different from the next. A common sequence of layering uses ply bias angles of +45°, −45°, 0° and 90° relative to the reference plane defined by the component to be built. For example, the reference plane may be defined relative to the long axis of a long, straight component such as a stringer, or relative to the central axis of a radial component such as a frame for a fuselage. This sequential stacking of additional ply bias angles creates an isotropic laminate that is more suitable for carrying loads in more than one direction. However, in order to form a circular axis, such as the central axis of a fuselage frame, some material must be sectioned and/or positioned at an orientation that is not ideal, potentially leading to lower strengths, increased labor, manufacturing time and waste.

Orientation requirements for conventional isotropic composite lay ups require layer by layer application of laminates to a bond tool, for example using laminates having the +45, −45, 0 and 90 degree ply angles described above. Thus, conventional methods of manufacturing larger composite parts with curved portions may require the use of multiple ply sections for each ply layer in order to maintain the ply orientation tolerance necessary to create an isotropic composite structure.

SUMMARY

In one aspect, the invention provides a method for fabricating a fiber reinforced composite structure which allows formation of a curved structure using a straight multi-ply charge. In an embodiment, the curved structure has a curved longitudinal or circumferential axis. The curved structure may be formed using a bond tool having a curved longitudinal or circumferential axis.

Forming a circular axis while maintaining orientation of 0 degree and 90 degree layers relative to the axis typically requires sectioning the material forming these layers. Attempting to stretch or compress layers whose fibers are oriented at 0° or 90° relative to the circular axis amounts to stretching or compressing in the direction of the fibers, which leads to distortion of the material layers (e.g., bunching). Thus, in order to maintain both a flat composite layer and the desired 0°/90° fiber orientation, the 0 degree and 90 degree layers are typically cut into many smaller pieces and individually placed about the circular axis. In addition to increasing labor, manufacturing time and waste, such sectioning compromises strength of a layer. For large, curved objects such as a fuselage frame, excessive sectioning of the 0 degree and 90 degree layers may reduce strength to the point that a laminate formed with +45°, −45°, 0° and 90° ply angles is not significantly stronger than a laminate formed of alternating +45° and −45° ply angles.

In one embodiment, a method for fabricating a fiber reinforced composite structure includes layering prepreg fiber reinforced composite plies into a tool layup. The plies may be layered in one at a time or in groups. In an embodiment, the bias angles of the plies in the charge are selected to facilitate formation of curved structures with little to no wrinkling or bunching of the plies. In an embodiment, the ply layup is not isotropic or quasi-isotropic. In an embodiment, bias angles of plies in the charge are other than 0 degrees and other 90 degrees with respect to the longitudinal axis of the charge. In another embodiment, there are no full plies in the charges with bias angles of 0 degrees or 90 degrees. For example, the bias angle in a unidirectional or a woven full ply layer may be from 30 to 60 degrees or from −30 to −60 degrees with respect to the longitudinal axis of the charge. Consecutive plies of the charge may be layered such that the fibers of one ply are at approximately 90 degrees relative to the fibers of a proximate ply. Each ply is cut on the bias at either plus 45 degrees or minus 45 degrees. The bias angles of the layered plies alternate one relative to the next. The layered plies are cured after layering.

In one embodiment, a fiber reinforced composite structure includes multiple plies of prepreg fiber reinforced material. Consecutive plies are layered such that (a) the fibers of one ply are at 90 degrees relative to the fibers of a proximate ply, and (b) the fibers of each ply are oriented at positive or negative 45 degrees with respect to a reference plane of the fiber reinforced composite structure.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
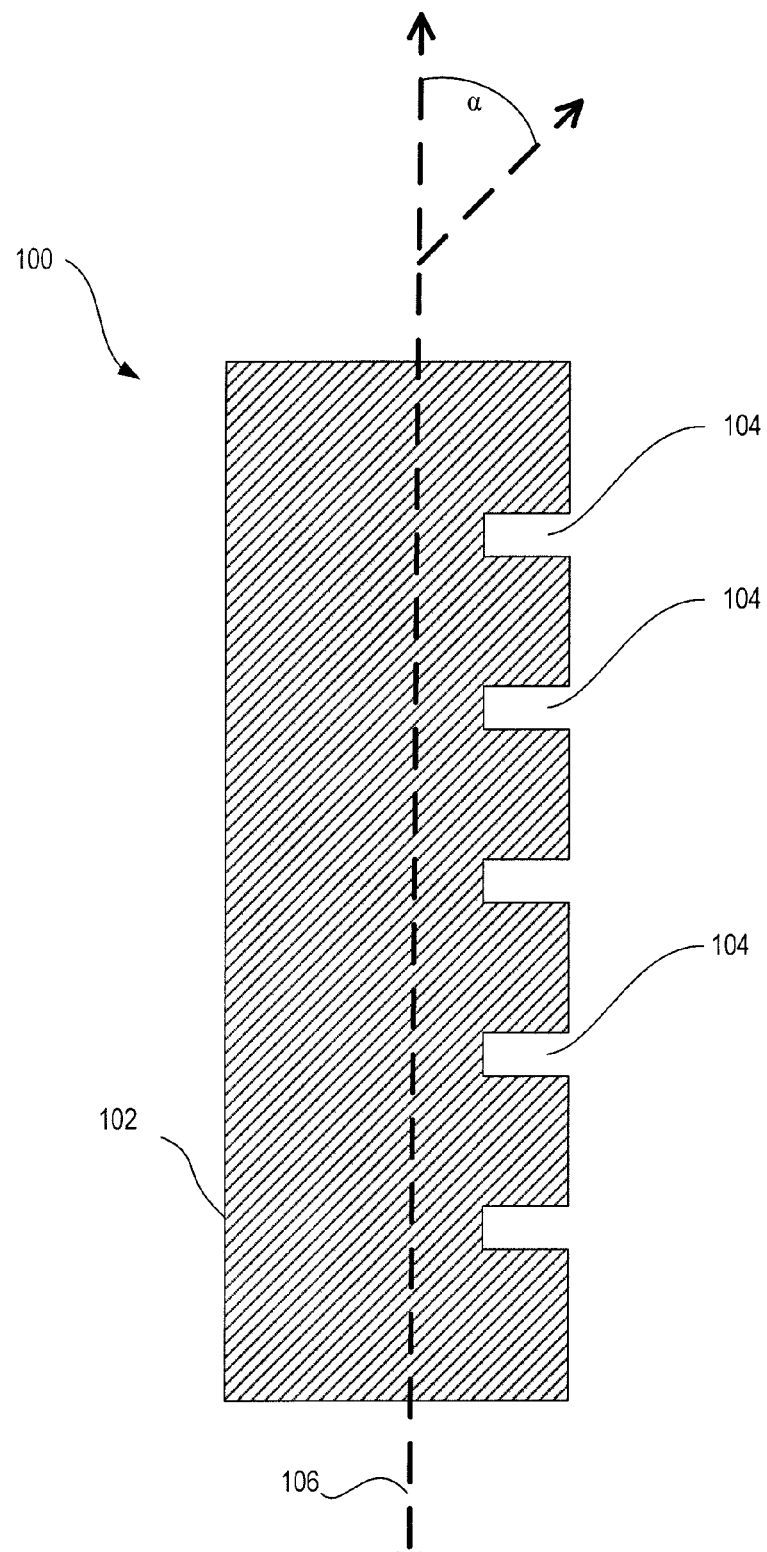
FIG. 1 shows a top view of a straight charge of multiple plies with stringer cut outs, for use in composite layup and forming systems and methods, according to an embodiment.

The present disclosure provides systems and methods for composite layup configuration to support detail fabrication. Composite layups may be formed using a non-standard ply bias layer orientation along with special trimmed features that allows for flat ply stacking of the composite laminate layers, reduces the number of required ply sections per ply layer orientation, and reduces waste of composite laminate materials. Hereafter, composite laminate layers may also be referred to as "plies, "composite layers" or simply "layers."

Each composite layer of the laminate comprises fibers and a matrix. The fibers may be continuous fibers rather than chopped fibers. Suitable fibers for use with the invention include, but not limited to carbon, graphite, fiberglass, KEVLAR® (aramid), Innegra™ (high modulus polypropylene for Innegra S), ceramic, and boron fibers. The matrix material may be a synthetic resin. The laminate may comprise partial plies which do not span the composite structure as well as full plies.

The positioning of the fibers in a given ply may be described by a characteristic fiber orientation. In a given ply, the bias angle of the fibers within the ply layer may characterize the fiber orientation. For a ply comprising fibers which are substantially unidirectionally oriented, the bias angle describes fiber orientation in the ply with respect to a reference, such as the longitudinal axis of the ply stack. The bias angle of the fibers may be in woven materials or in unidirectional materials. Embodiments of the present disclosure are equally useful for unidirectional ply layers and woven ply layers. For a ply with woven fibers, there may be more than one bias angle present in the layer. For example, the warp fibers may have one bias angle and the weft fibers another.

In an embodiment, the characteristic fiber orientation of each full-width ply of a straight charge is from 30 to 60 degrees or from −30 to −60 degrees with respect to the longitudinal axis of the straight charge and the sign of the characteristic fiber orientation of each full width ply of the straight charge alternates with respect to the sign of the characteristic fiber orientation of each neighboring ply (i.e. the plies of the stack alternate between + and − orientations). In an embodiment, the characteristic fiber orientation of each full width ply of the straight charge forms an angle of 80 to 100 degrees with respect to the characteristic fiber orientation of each neighboring ply. The bias angle of the fibers within a ply layer may also be limited to 40 to 50 degrees or −40 to −50 degrees, or limited to +45° or −45° relative to the longitudinal axis of the charge.

A curved composite layup may be formed by placing a multi-layer straight charge into a tool layup comprising a bond tool, the bond tool comprising a curved longitudinal or circumferential axis. The straight charge is reshaped to conform to at least a portion of the bond tool, thereby forming a composite layup with a curved longitudinal or circumferential axis. Placing layers with bias angles from 30 to 60 degrees or from −30 to −60 degrees can allow the layers to be shaped to a curved structure with significantly less to no bunching than would be obtained for layers with bias angles near 90 degrees to the longitudinal axis of the ply stack. In an embodiment, manipulating the layers does not push or pull directly on the fibers, but rather changes the relationship of the fibers to one another. In an embodiment, each full width ply of the composite layup comprises a characteristic fiber orientation that is from 30 to 60 degrees or from −30 to −60 degrees with respect to the bond tool axis and the sign of the characteristic fiber orientation of each full width ply in alternates with respect to the sign of characteristic fiber orientation of each neighboring ply. In an embodiment, the characteristic fiber orientation of each full width ply of the layup forms an angle of 80 to 100 degrees with respect to the characteristic fiber orientation of each neighboring ply. In other embodiments, the bias angle of the fibers within a ply layer may be limited to 40 to 50 degrees or −40 to −50 degrees, or limited to +45° or −45° relative to the reference plane defined by the structure to be created. For example, bias angles may be limited to +45° or −45° relative to the long axis of a stringer.

Limiting layer orientation to +45 degrees or −45 degrees provides a more efficient method of manufacturing composites, especially those that have complex shapes, such as a curved runner of a fuselage skeleton. Layering alternating ply layers having a fiber bias of +45 degrees and −45 degrees creates a composite structure, the strength of which is not reduced from that of a typical isotropic laminate because this orientation eliminates ply splices and related off-axis ply orientation. Additionally, waste is reduced by layering alternating ply layers having a fiber bias angle of +45 degrees and −45 degrees when making a curved composite structure. Layers having a bias angle of +45 degrees and −45 degrees through an arc, such as a curved runner, are still within the tolerances that allow for the additional strength imparted to the composite structure through a pseudo-isotropic laminate.

FIG. 1 depicts a straight charge material with trimming for stringer cut outs that allows a straight charge of material to form to the required shape of a bond tool. As used herein, a straight charge is generally rectangular in shape and is not substantially curved. Straight charge of ply material 102 of a composite laminate layer 100 includes cut outs 104 (not all cut outs 104 are labeled). The ply layer bias orientation of laminate 100 is either +45 degrees or −45 degrees relative to a long axis of ply material 102, then long axis represented by line 106. As indicated by angle α, the bias orientation of straight charge 102 is +45 degrees. It will be appreciated that the bias orientation may also be −45 degrees, or, where ply material 102 is a woven material, it may include fibers running at +45 degrees and at −45 degrees relative to axis 106.

Figure 2:
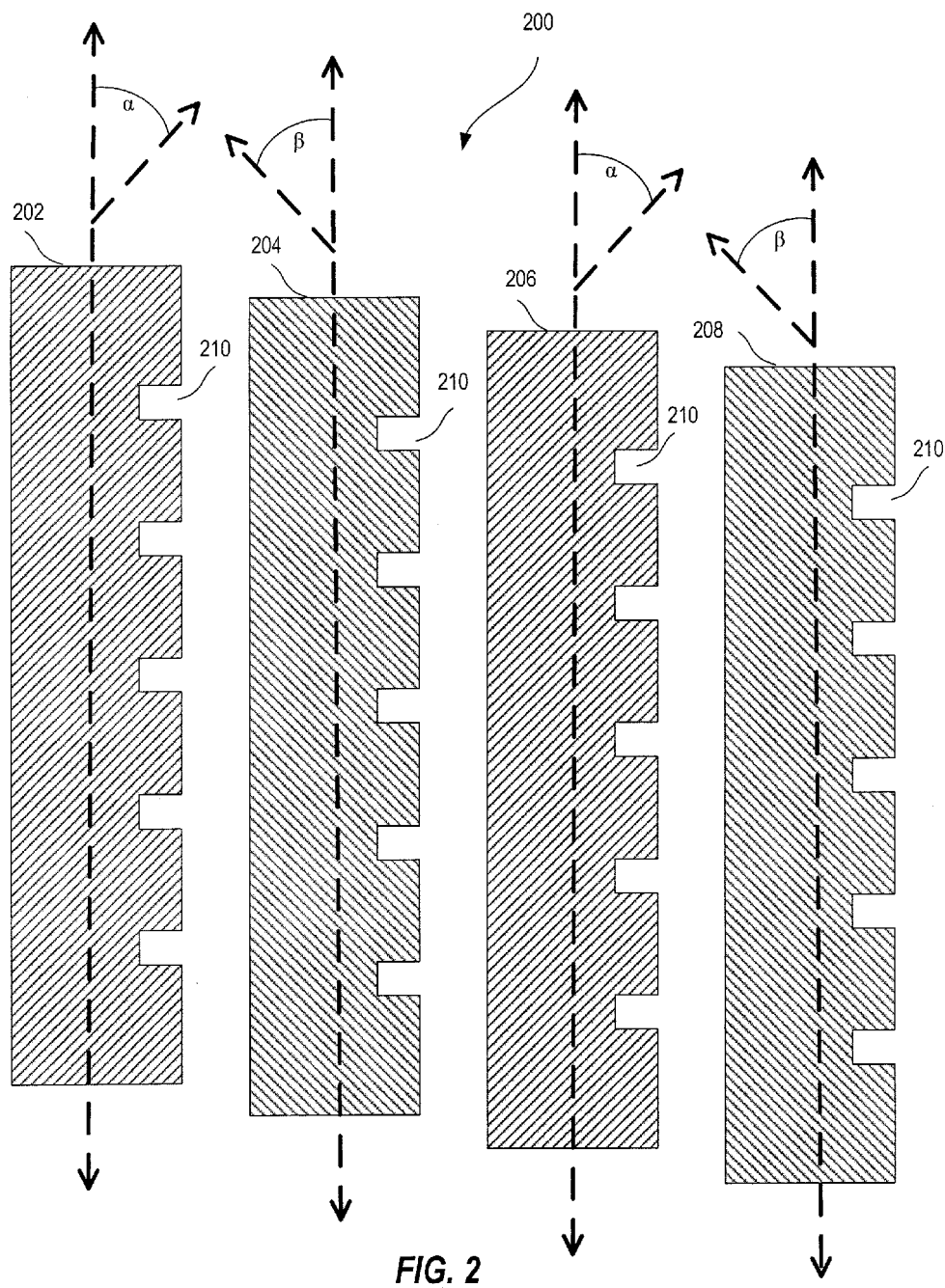
FIG. 2 shows a top view of multiple straight charge plies with stringer cut outs and having bias angles of +45 degrees or −45 degrees, for use in composite layup and forming systems and methods, according to an embodiment.

FIG. 2 shows multiple straight charge layers 202, 204, 206 and 208 that may be placed together with a bond tool and cured to form a composite laminate. Layers 202 and 206 are cut to form to a bond tool such that the bias angle of their fibers is +45 degrees relative to the reference plane of the bond tool, as indicated by angles α. For example, fibers of layers 202 and 206 may be at +45 degrees relative to the long axis of the bond tool if the bond tool is configured to form a long, straight component, or relative to a curved or circular axis of the bond tool if the bond tool is formed to support a curved or circular component, such as a fuselage frame.

Layers 204 and 208 are cut to form to a bond tool such that the bias angle of their fibers is −45 degrees relative to the reference plane, as indicated by angles β. Layers 202-208 may be referred to herein as layers cut on the bias. The bias cut of layers 202-208 allows the relationship of fibers of the layers to change relative to one another, such that layers 202-208 may be laid flat upon a curved bond tool. Layers 202-208 may be separately cut from lengths of composite laminate material, stacked together and then trimmed to form cutouts 210. Likewise, sections of the general size and shape of layers 202-208 may be rough-cut from lengths of composite laminate material, stacked together and trimmed to form layers 202-208, or optionally, the layers may be cut to their desired form prior to stacking.

Figure 3:
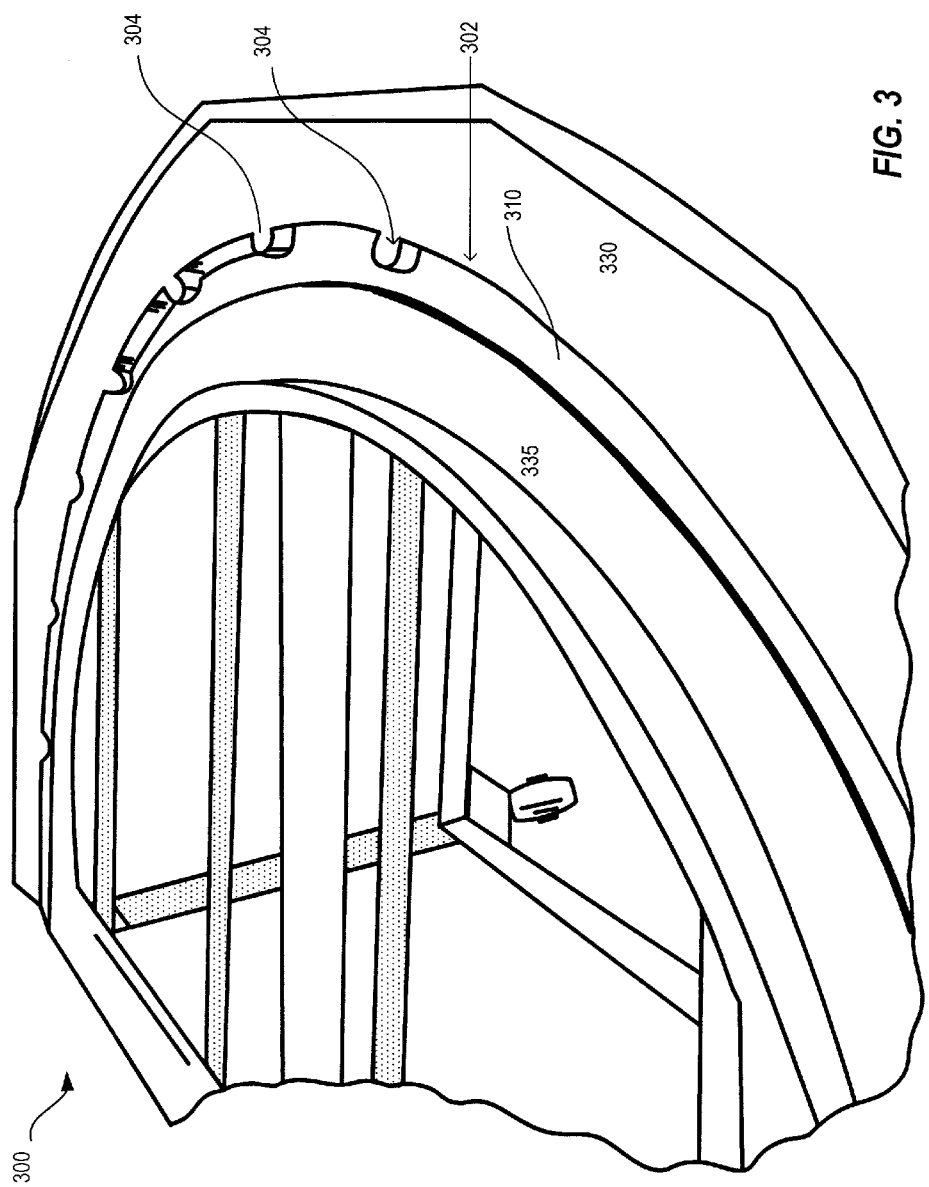
FIG. 3 is a partial perspective view of a bond tool for supporting a composite layup, according to an embodiment.

FIG. 3 is a partial perspective view of a bond tool 300 useful for manufacturing composite structures using methods of the present disclosure. Bond tool 300 has a mold 302 with structural features 304 (not all features 304 are labeled). As shown in FIG. 3, a first surface 310 of the mold is at lower elevation as compared to adjacent portions of the bond tool (330, 335). There is also a gap between first surface 310 and bond tool portion 335, as indicated by the heavier weight line at the lower portion of the radially inward edge of surface 310. Mold 302 receives laminate layers, for example, layers 202-208, which may be pre-impregnated (prepreg) with resin. The prepreg laminate layers, for example, layers 202-208, are layered with the bond tool and upon one another with each layer having an alternating ply bias orientation of such as +45 degrees or −45 degrees. Mold 302 may be of any shape.

In an embodiment, the mold 302 comprises a first surface 310 on which the laminate stack may be placed. The first surface may be substantially horizontal and/or may form an upper surface of the mold. The first surface of the mold may also be substantially flat or planar. As used herein, a surface is substantially horizontal when at least 50% of the surface is within +/−10 degrees of horizontal. The first surface of the mold may also be curved so that the radius of curvature lies in the plane of the first surface of the mold, as shown in FIG. 3. The radius of curvature may be 60 inches or greater or 40 inches or greater. The maximum curvature of the mold (in the plane of the first surface of the mold) may be greater than zero and less than or equal to 0.0167 in$^{-1}$ or greater than zero and less than 0.022 in$^{-1}$. Due to the curvature of the mold 302, the radially inward edge of surface 310 is shorter than the radially outward edge having structural features 304. Accordingly, the prepreg laminate layers 202-208, which are straight, may have a shorter spacing between cutouts 210 compared to a longer spacing between structural features 304 of curved mold 302 such that the prepreg laminate layers 202-208 may be reshaped and manipulated for cutouts 210 to conform to the plurality of structural features 304. Because the fibers are oriented with bias angles of for example 30 to 60 degrees, the layers 202-208 may be reshaped to the curved mold 302 with significantly less to no bunching than would be obtained for layers with bias angles near 90 degrees to the longitudinal axis of the ply stack.

The mold 302 may also comprise a second surface which makes a specified angle with respect to the first surface. In an embodiment, the first surface is an upper surface and the second surface is a side surface that makes an angle of approximately 90 degrees with respect to the upper surface. For example, the angle between the upper surface and the side surface may be from 90 to 100 degrees. When the ply stack conforms to these first and second surfaces, the edge of the ply stack will be bent relative to the center portion to form a composite layup with a "leg" that is generally transverse to the center portion. In an embodiment, the charge further comprises a plurality of partial plies of unidirectionally oriented fibers, the characteristic fiber orientation of each of the partial plies being generally aligned with the longitudinal axis of the charge. For example, the characteristic fiber orientation of each of the partial plies may be from +5 degrees to −5 degrees with respect to the longitudinal axis of the charge. The partial plies may be located near a longitudinal edge of the ply stack, with the edge of the each partial ply generally aligning with the longitudinal edge of the ply stack. In an embodiment, if cutouts are formed at one longitudinal edge of the ply stack the partial plies are located are located at the other longitudinal edge of the ply stack. The width of the partial plies may be selected so that the partial plies do not extend across the first surface of the mold. In an embodiment, the width of each partial ply is from 20% to 30% or about 25% of the width of the full plies. After formation of the composite structure, these partial plies are located at the outer edges or "caps" of the composite structure. The fiber orientation in the "leg" of the composite structure may be generally aligned with the longitudinal or circumferential axis of the bond tool.

Structural features 304 impart additional features to the composite structure formed in mold 302. Structural features 304 are depicted in a configuration that allows for stringers to be fixed to an arcuate runner formed by mold 302. Structural features 304 may be configured to impart any structural feature to the composite structures formed with mold 302 and made with bond tool 300. Cutouts 210 of layers 202-208 may be shaped and sized to fit with structural features 304 of mold 302.

Figure 4:
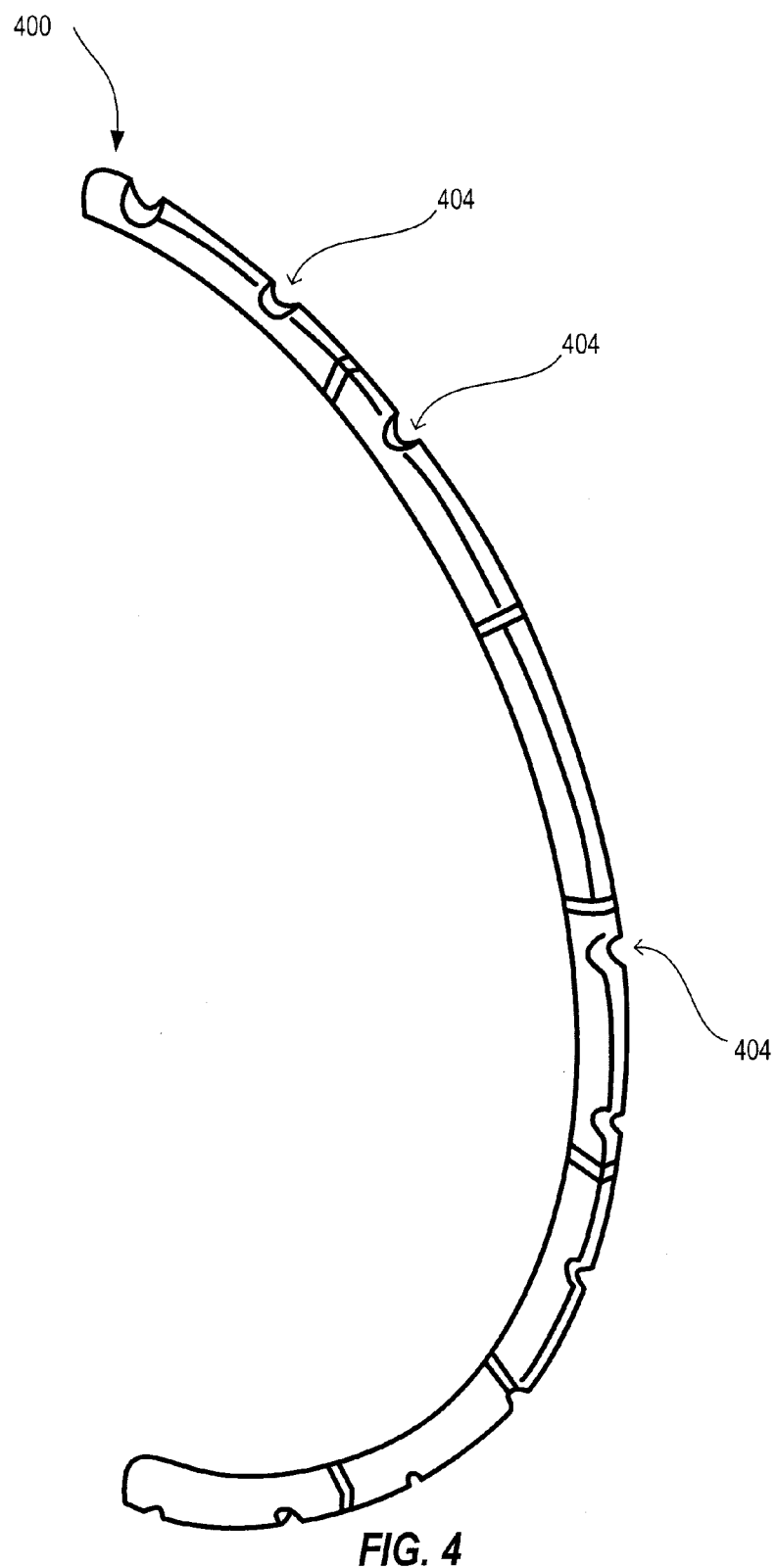
FIG. 4 is a perspective view of a composite component formed of layers of ply material having bias angles of +45 degrees or −45 degrees, according to an embodiment.

FIG. 4 depicts a composite structure 400 manufactured by layering laminate material layers having either a +45 degree or −45 degree fiber bias angle. The laminate layers are cured according to means known in the art. Alternately, the layers may be fast cured as described in copending U.S. patent application Ser. No. 13/763,416 by Boone et al, filed 8 Feb. 2012, for example using an internally heated and pressurized system and method as described in U.S. patent application Ser. No. 13/763,584 by Boone et al, also filed 8 Feb. 2012. Both of the aforementioned applications are incorporated herein by reference. In addition, the systems and method disclosed herein may be used with a skeleton structure assembly as described in U.S. patent application Ser. No. 13/763,427 by Boone et al., filed 8 Feb. 2013, which is also incorporated herein by reference.

As shown, composite structure 400 is an arcuate runner having stringer cut outs 404 (not all labeled). As its laminate layers are not sectioned, or less sectioned, than layers at 0 degrees or 90 degrees relative to the circular axis of structure 400, composite structure 400 may be as strong as an arcuate runner formed with multi-sectioned 0 degree or 90 degree composite layers.

Figure 5:
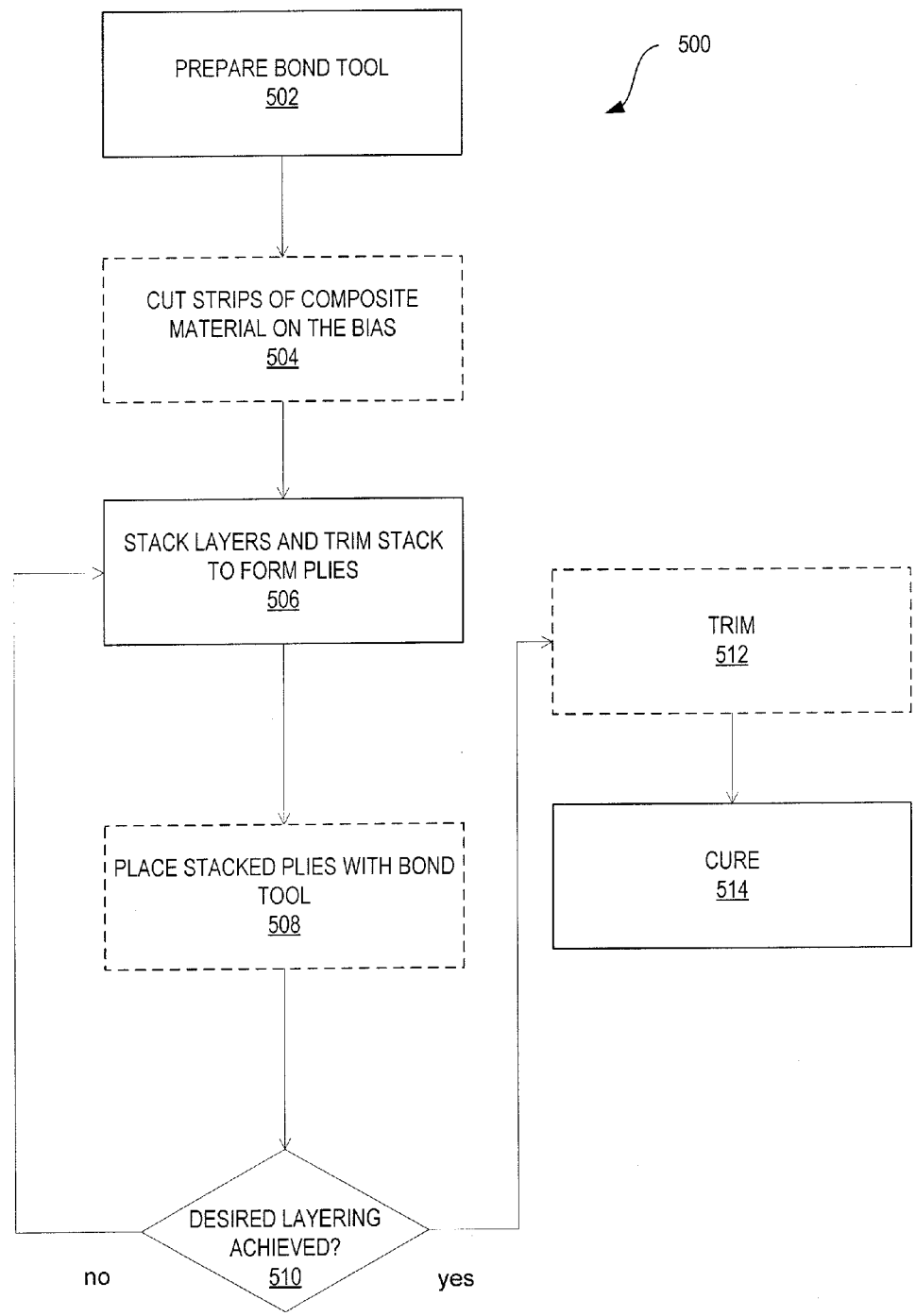
FIG. 5 is a flow chart illustrating a method of forming a composite layup, according to an embodiment.

FIG. 5 is a flow chart illustrating a method 500 of forming a composite layup. A bond tool is prepared, in step 502. In one example of step 502, a mold is placed and secured with the bond tool. In optional step 504, strips of composite material are cut from a length or lengths of composite material on the bias such as at +45 degrees or −45 degrees. Step 504 is optional, as strips may be pre-cut to a desired width. In one example of optional step 504, one or more strips are cut on the bias, at a +45 degree angle to a fiber direction of the composite material, and one or more strips are cut on the bias, at a −45 degree angle to the fiber direction of the composite material.

In step 506, the strips of composite material are stacked together in alternating bias layers, and the stack is trimmed to form plies (composite layers) of a composite laminate structure. In one example of step 506, the +45 degree angle strips are described above are alternated with the −45 degree angle strips of composite material, and the stack is trimmed such that the +45 degree strips form plies 202 and 206 and the −45 degree strips form plies 204 and 208 (FIG. 2). The stack is likewise trimmed in order to fit a shape of the mold. For example, cut-outs 210 may be trimmed into the stack to facilitate aligning the stack with the mold. It will be appreciated that the composite material from which the strips are cut may be a woven layer having fibers oriented at both +45 degrees and −45 degrees relative to the reference plane of the arcuate runner. In another example, the composite material is a straight charge of material, and the resulting strip(s) and ply/plies have fibers oriented at +/−45 degrees relative to the reference plane.

The stacked plies are placed with the bond tool (i.e., with the mold), in step 508. Due to prior stacking and trimming to fit features of the bond tool/mold, fibers of the composite layers may be oriented at +45 degrees and/or −45 degrees relative to the reference plane of the mold. In one example of step 508, where the mold is for an arcuate runner, placing the ply stack with the bond tool includes manipulating the stack to lie flat while conforming to the curved shape of the mold, which may be facilitated by reshaping the ply stack such that cutouts 210 conform to the plurality of structural features 304. Cutouts 210 may have a first spacing therebetween that is less than a second spacing between structural features 304 due to the location of structural features 304 along the radially outward edge of curved mold 302.

Step 510 is a decision. If the desired layering is achieved, for example to form a particular composite component, the layers may be additionally trimmed, if necessary, in optional step 512, and the layup is cured, in step 514. In one example of method 500, up to six layers are stacked and trimmed together and placed in the bond tool mold (steps 504-508). If additional layers are desired (decision 510), steps 504-508 MAY repeat until the desired layering is achieved. In another example of method 500, strips of material are layered and trimmed in groups of three to four layers until the desired layering is achieved. It will be appreciated that the layup formed by method 500 may be cured according to methods known in the art (for example, under heat and/or pressure), or according to methods and/or using systems laid out in the copending U.S. Patent Applications incorporated by reference above. It will also be appreciated that optional trimming step 512 may be unnecessary, as adequate trimming of the stacked layers may be achieved at step 506.

Changes may be made in the above system and method without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present system and method, which, as a matter of language, might be said to fall there between.

What is claimed is:

1. A method for fabricating a curved fiber reinforced composite structure, the method comprising the steps of:
    a) forming a straight charge having a longitudinal axis and a plurality of cut-out features along an edge of the straight charge, wherein the plurality of cut-out features are each separated by a first spacing, and comprising a plurality of full-width prepreg fiber reinforced composite plies, a characteristic fiber orientation of each full-width ply of the straight charge being from 30 to 60 degrees or from −30 to −60 degrees with respect to the longitudinal axis of the straight charge and the sign of the characteristic fiber orientation of each full width ply of the straight charge alternating with respect to the sign of the characteristic fiber orientation of each neighboring ply;
    b) forming a curved composite layup by placing the straight charge of step a) into a tool layup comprising a bond tool, the bond tool comprising a curved longitudinal or circumferential axis and a mold, the mold having a curved shape and comprising structural features each separated by a second spacing greater than the first spacing which engage the plurality of cut-out features of the straight charge and the straight charge being reshaped to conform to the plurality of structural features of the mold such that the characteristic fiber orientation of each full-width ply is reshaped to be relative to the curved longitudinal or circumferential axis of the bond tool; and
    c) curing the curved composite layup of step b), thereby forming a curved fiber reinforced composite structure.

2. The method of claim 1, wherein the characteristic fiber orientation of each full-width ply of the straight charge is from 40 to 50 degrees or from −40 to −50 degrees with respect to the longitudinal axis of the straight charge.

3. The method of claim 2, wherein the characteristic fiber orientation of each full width ply of the straight charge forms an angle of 80 to 100 degrees with respect to the characteristic fiber orientation of each neighboring ply.

4. The method of claim 3, wherein the straight charge further comprises a plurality of full-width plies of woven fibers.

5. The method of claim 1, wherein the straight charge comprises a plurality of full-width plies of unidirectionally oriented fibers.

6. The method of claim 1, wherein the straight charge further comprises a plurality of partial plies of unidirectionally oriented fibers, an edge of each partial ply aligning with an edge of the straight charge and the characteristic fiber orientation of each of the partial plies of the straight charge being aligned with the longitudinal axis of the straight charge.

7. The method of claim 1, wherein a plurality of straight charges are layered into the tool layup prior to step c).

8. The method of claim 1, wherein the radius of curvature of the bond tool axis is 60 inches or greater.

9. The method of claim 1 wherein the mold comprises a surface comprising a planar substantially horizontal portion and being curved so that the radius of curvature lies in the plane of the surface.

10. The method of claim 9, wherein each full width ply of the composite layup comprises a characteristic fiber orientation in a plane parallel to the planar substantially horizontal portion of the surface of the mold that is from 30 to 60 degrees or from −30 to −60 degrees with respect to the bond tool axis and the sign of the characteristic fiber orientation of each full width ply in a plane parallel to the planar substantially horizontal portion of the surface of the mold alternates with respect to the sign of characteristic fiber orientation of each neighboring ply.

* * * * *